United States Patent Office 2,995,454
Patented Aug. 8, 1961

2,995,454
DRY BINDER AND PROCESS FOR
PREPARING THE SAME
Egon Handl, Doorneerdelaan 11, Amstelveen,
Netherlands
No Drawing. Filed Feb. 26, 1957, Ser. No. 642,370
Claims priority, application Netherlands Oct. 12, 1956
11 Claims. (Cl. 106—77)

The invention relates to a new dry binder, comprising in physical admixture, a major proportion of anhydrite (substantially anhydrous calcium sulphate) and minor proportions of an alkali metal silicate and a non-alkali metal salt and also relates to a process for preparing said binder.

It is known in the art to use ground anhydrite in combination with various other substances as a binder. It has already been proposed to mix the finely ground anhydrite with Portland cement, quick lime, limestone, sulphates or various organic substances, as the finely ground anhydrite cannot set without these additions. It has also been previously proposed for the preparation of concrete to treat the finely ground anhydrite with solutions of an alkali metal silicate. Thus, in the United States Patent No. 2,292,198, a fairly complicated process has been described for preparing concrete from ground anhydrite, which has been pretreated, preferably at an elevated temperature, with a dilute solution of sodium silicate, whereafter the finely anhydrite, which by this treatment has been coated with a gel, is filtered off and dried or may be directly used in wet condition. The coated anhydrite may also be mixed with a solution of an alkali metal silicate for preparing concrete, which mixture then sets to a hard mass. Evidently this entire treatment ought to be carried out upon the building site, which is not economical on account of the cost of the apparatus, energy and work. However, with these known anhydrites containing binders it is not possible to prepare a concrete for bearing constructions.

The invention provides a dry binder, which may be packed and shipped in bags, and like Portland cement need only be stirred with water.

The process according to the invention consists in grinding the anhydrite together with a small proportion of dry alkali metal silicate, preferably sodium silicate, and a small proportion of a dry salt of a non-alkali metal, such as aluminium, ferric or ferrous iron, copper, zinc, manganese, chromium or nickel. Alternatively the finely ground anhydrite may be intimately mixed with the finely ground alkali metal silicate and the finely ground non-alkali metal salt. In this manner a dry binder is obtained, which for preparing concrete, is stirred upon the building site with water, if desired with addition of a suitable filler.

If the process is used for making buildings which must be resistant against acids, or if the water is limy, a small amount of an acid may be added to it.

For acidifying the make-up water any acid may be used. Suitably sulphuric acid is used, and on account of the lower price, preferably waste sulphuric acid. The proportion of the acid to be added to the make-up water is small and amounts to about 10% by weight of $H_2SO_4$ or the equivalent quantity of another acid. The proportions of dry alkali metal silicate and dry metal salts are also small and may vary between 2 and at the utmost 25% by volume.

The new dry binder of the invention has many advantages. Its preparation is very cheap, as its dry constituents merely ought to be ground, without burning or heating and the chemicals used in small proportions are not costly. The concrete prepared with the binder according to the invention sets chemically very rapidly within about two hours and reaches after a few days a crushing strength about equal to that of the anhydrite used (400–600 kg./cm.$^2$). It adheres better to iron reinforcement than Portland cement and may be used for all building purposes, especially for concrete constructions, tiles and terrazo floors.

As a filler sand may be used, but it is preferred to use the coarse grains and small pieces obtained with the breaking of the anhydrite, if desired together with finely ground anhydrite.

The invention will be explained in more details by reference to the following specific example, which is intended as being illustrative only.

Example

One hundred parts by volume (=100 parts by weight) of finely ground anhydrite of which the particles pass through a Tyler sieve with 150 meshes or more, are intimately mixed with 5 parts by volume =3 parts by weight) of finely divided sodium silicate and 5 parts by volume (=6 parts by weight) of finely divided hydrated ferrous sulphate. For manufacturing concrete the binder so obtained is stirred with water, which may contain about 10% by weight of $H_2SO_4$, preferably by adding the equivalent proportion of waste sulphuric acid and with addition of 500 parts by volume of sand or, preferably, of 300 parts by volume of coarse anhydrite and 200 parts by volume of finely ground anhydrite. The concrete so obtained sets in two hours and shows after a few days, depending upon the nature of the anhydrite, a crushing strength between about 400 and about 600 kg./cm.$^2$.

With the same results the ferrous sulphate may be replaced by other metal salts, especially by aluminium, copper, zinc and chromium salts in equivalent quantities.

Having now particularly described and ascertained the nature of my said invention and in what manner the same is to be performed I declare that what I claim is:

1. A dry binder which may be packed, stored and shipped in bags, consisting essentially of between 2 percent and 25 percent by volume of a finely divided dry alkali metal silicate and between 2 percent and 25 percent by volume of a finely divided sulphate of a non-alkali metal selected from the group consisting of salts of aluminum, ferrous iron, ferric iron, copper, zinc, manganese, chromium and nickel, the balance being substantially finely-ground naturally-occurring unmodified anhydrite.

2. A process for preparing a dry binder which consists essentially of grinding a mixture consisting essentially of between 2 percent and 25 percent by volume of a dry alkali metal silicate, and between 2 percent and 25 percent by volume of a non-alkali metal sulphate selected from the group consisting of salts of aluminum, ferrous iron, ferric iron, copper, zinc, manganese, chromium and nickel, the balance being substantially finely-ground naturally occurring unmodified anhydrite.

3. A process for preparing a dry binder which consists essentially of intimately mixing a mixture consisting essentially of between 2 percent and 25 percent by volume of a finely divided dry alkali metal silicate, and between 2 percent and 25 percent by volume of a finely divided non-alkali metal sulphate selected from the group consisting of salts of aluminum, ferrous iron, ferric iron, copper, zinc, manganese, chromium and nickel, the balance being substantially finely-ground naturally-occurring unmodified anhydrite.

4. A process for the production of concrete which consists essentially of mixing water with a binder consisting essentially of between 2 percent and 25 percent by volume of a finely divided dry alkali metal silicate and between 2 percent and 25 percent by volume of a finely divided sulphate of a non-alkali metal selected from the group consisting of salts of aluminum, ferrous iron, ferric iron, copper, zinc, manganese, chromium and nickel, the balance being substantially finely-ground naturally-occurring unmodified anhydrite, and allowing the resultant wet mass to stand.

5. A process for the production of concrete which consists essentially of mixing water containing up to about 10% by weight of sulfuric acid with a binder consisting essentially of between 2 percent and 25 percent by volume of a finely divided dry alkali metal silicate and between 2 percent and 25 percent by volume of a finely divided salt of a non-alkali metal selected from the group consisting of sulphates of aluminum, ferrous iron, ferric iron, copper, zinc, manganese, chromium and nickel, the balance being substantially finely-ground naturally-occuring unmodified anhydrite, and allowing the resultant wet mass to stand.

6. A process for the production of concrete which consists essentially of mixing water and a filler with a binder consisting essentially of between 2 percent and 25 percent by volume of a finely divided dry alkali metal silicate and between 2 percent and 25 percent by volume of a finely divided salt of a non-alkali metal selected from the group consisting of sulphates of aluminum, ferrous iron, ferric iron, copper, zinc, manganese, chromium and nickel, the balance being substantially finely-ground naturally-occurring unmodified anhydrite, and allowing the resultant wet mass to stand.

7. A process for the production of concrete which consists essentially of mixing together water containing up to about 10 percent by weight of sulfuric acid, a filler, and a binder consisting essentially of between 2 percent and 25 percent by volume of a finely divided dry alkali metal silicate and between 2 percent and 25 percent by volume of a finely divided salt of a non-alkali metal selected from the group consisting of sulphates of aluminum, ferrous iron, ferric iron, copper, zinc, manganese, chromium and nickel, the balance being substantially finely-ground naturally-occurring unmodified anhydrite, and allowing the resultant wet mass to stand.

8. A process for the production of concrete which consists essentially of mixing water and coarse grains of anhydrite with a binder consisting essentially of between 2 percent and 25 percent by volume of a finely divided dry alkali metal silicate and between 2 percent and 25 percent by volume of a finely divided salt of a non-alkali metal selected from the group consisting of sulphates of aluminum, ferrous iron, ferric iron, copper, zinc, manganese, chromium and nickel, the balance being substantially finely-ground naturally-occurring unmodified anhydrite, and allowing the resultant wet mass to stand.

9. A process for the production of concrete which consists essentially of mixing together water containing up to about 10 percent by weight of sulfuric acid, coarse grains of anhydrite, and a binder consisting essentially of between 2 percent and 25 percent by volume of a finely divided dry alkali metal silicate and between 2 percent and 25 percent by volume of a finely divided salt of a non-alkali metal selected from the group consisting of sulphates of aluminum, ferrous iron, ferric iron, copper, zinc, manganese, chromium and nickel, the balance being substantially finely-ground naturally-occurring unmodified anhydrite, and allowing the resultant wet mass to stand.

10. A process as defined in claim 2, wherein said silicate is sodium silicate.

11. A process as defined in claim 3, wherein said silicate is sodium silicate.

References Cited in the file of this patent

UNITED STATES PATENTS

| | | |
|---|---|---|
| 194,629 | Vorse | Aug. 28, 1877 |
| 217,713 | Stewart | July 22, 1879 |
| 326,317 | Mixer | Sept. 15, 1885 |
| 502,096 | Heller | July 25, 1893 |
| 1,442,406 | Hennicke | Jan. 16, 1922 |
| 2,379,222 | Etridge et al. | June 26, 1945 |
| 2,410,390 | Paley | Oct. 29, 1946 |
| 2,531,496 | Bean | Nov. 28, 1950 |

FOREIGN PATENTS

| | | |
|---|---|---|
| 721,318 | Great Britain | Jan. 5, 1955 |